United States Patent
Liu et al.

(10) Patent No.: US 10,042,046 B2
(45) Date of Patent: Aug. 7, 2018

(54) SYSTEM AND METHOD FOR RADAR IMAGING USING DISTRIBUTED ARRAYS AND COMPRESSIVE SENSING

(71) Applicant: Mitsubishi Electric Research Laboratories, Inc., Cambridge, MA (US)

(72) Inventors: Dehong Liu, Lexington, MA (US); Ulugbek Kamilov, Cambridge, MA (US); Petros T Boufounos, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 135 days.

(21) Appl. No.: 14/792,710

(22) Filed: Jul. 7, 2015

(65) Prior Publication Data
US 2017/0010352 A1    Jan. 12, 2017

(51) Int. Cl.
*G01S 13/89* (2006.01)
*G01S 13/00* (2006.01)
*G01S 13/87* (2006.01)

(52) U.S. Cl.
CPC .......... *G01S 13/89* (2013.01); *G01S 13/003* (2013.01); *G01S 13/878* (2013.01)

(58) Field of Classification Search
CPC ...... G01S 13/89; G01S 13/90; G01S 13/9035; G01S 14/9094; G06T 3/4053; G06T 5/50
See application file for complete search history.

(56) References Cited

U.S. PATENT DOCUMENTS

| 7,173,560 B2 | 2/2007 | Li et al. | |
|---|---|---|---|
| 2010/0302086 A1* | 12/2010 | Dudgeon | H03M 7/30 341/155 |
| 2012/0250748 A1* | 10/2012 | Nguyen | G01S 13/90 375/224 |
| 2014/0077989 A1* | 3/2014 | Healy, Jr. | G01S 13/9035 342/25 F |

(Continued)

OTHER PUBLICATIONS

Candes et al., "Robust uncertainty principles: Exact signal reconstruction from highly incomplete frequency information," IEEE Transactions on Information Theory, vol. 52(2), Feb. 2006.

(Continued)

*Primary Examiner* — Peter M Bythrow
*Assistant Examiner* — Daniel P Malley, Sr.
(74) *Attorney, Agent, or Firm* — Gene Vinokur; James Mcaleenan; Hironori Tsukamoto

(57) ABSTRACT

A method and system for generating a high resolution two-dimensional (2D) radar image, by first transmitting a radar pulse by a transmit antenna at an area of interest and receiving echoes, corresponding to reflection the radar pulse in the area of interest, at a set of receive arrays, wherein each array includes and a set of receive antennas that are static and randomly distributed at different locations at a same side of the area of interest with a random orientation within a predetermined angular range. The the echoes are sampled for each receive array to produce distributed data for each array. Then, a compressive sensing (CS) procedure is applied to the distributed data to generate the high resolution 2D radar image.

9 Claims, 3 Drawing Sheets

(56) References Cited

U.S. PATENT DOCUMENTS

| | | | |
|---|---|---|---|
| 2014/0240163 A1* | 8/2014 | Boufounos | G01S 7/03 342/27 |
| 2014/0266869 A1* | 9/2014 | Liu | 342/25 F |
| 2015/0276917 A1* | 10/2015 | Dawber | G01S 7/003 342/25 A |
| 2015/0309097 A1* | 10/2015 | Baskaran | G01R 23/02 702/189 |
| 2016/0116620 A1* | 4/2016 | Sassen | G01V 1/368 702/17 |

OTHER PUBLICATIONS

Baraniuk et al., "Compressive radar imaging," in IEEE Radar Conference, MA, Apr. 2007.

M. A. Herman and T. Strohmer, "High-resolution radar via compressed sensing," IEEE Trans. Signal Process., vol. 57, Jun. 2009.

Potter et al., "Sparsity and compressed sensing in radar imaging," Proceeding of the IEEE, vol. 98, pp. 1006-1020, Jun. 2010.

P.T. Boufounos, D. Liu, H. Mansour, and S. Sahinoglu, "Sparse MIMO architectures for through-the-wall imaging," in IEEE Sensor Array and Multichannel Signal Processing Workshop(SAM), Jun. 2014, pp. 513-516.

D.L. Donoho, Y. Tsaig, I. Drori, and J.-L. Starck, "Sparse solution of underdetermined systems of linear equations by stagewide orthogonal matching pursuit," IEEE Trans. Information Theory, Feb. 2012.

Liu et al., "Random steerable arrays for synthetic aperture imaging," ICASSP, 2013.

A. Beck and M. Teboulle, "Fast gradient-based algorithm for constrained total variation image denoising and deblurring problems," IEEE Trans. Image Process., vol. 18, No. 11, pp. 2419-2434, Nov. 2009.

M. Tao and J. Yang, "Alternating direction algorithms for total variation deconvolution in image reconstruction," TR 0918, Department of Mathematics, Nanjing University, 2009.

Boyd et al, "Distributed optimization and statistical learning via the alternating direction method of multipliers," Foundations and Trends in Machine Learning, vol. 3, No. 1, pp. 1-22, 2011.

* cited by examiner

US 10,042,046 B2

SYSTEM AND METHOD FOR RADAR IMAGING USING DISTRIBUTED ARRAYS AND COMPRESSIVE SENSING

FIELD OF THE INVENTION

This invention relates generally to radar systems, and more particularly radar imaging using distributed arrays and compressive sensing.

BACKGROUND OF THE INVENTION

In order to locate targets in an area of interest, radar system transmits pulses and process received echoes reflected by the targets. The echoes can be characterized as a weighted combination of delayed pulses, where complex weights depend on specific target reflectivities. Given the pulses and echoes, radar images can be generated in a range-azimuth plane according to corresponding weights and delays. The azimuth resolution of the radar images depends on a size of an array aperture, and a range resolution depends on a bandwidth of the pulses.

It can be difficult or expensive to construct a large enough aperture to achieve a desired azimuth resolution. Therefore, multiple distributed sensing platforms, each equipped with a relative small aperture array, can be used to collaboratively receive echoes. Benefits of distributed sensing include flexibility of platform placement, low operation and maintenance cost, and a large effective aperture. However, distributed sensing requires more sophisticated signal processing compared to that of a single uniform linear array. Conventional radar imaging methods typically process the echoes received by each sensor platform individually using matched filter. Then, the estimates are combined in a subsequent stage. Generally, the platforms are not uniformly distributed so that the radar images can exhibit annoying artifacts, such as aliancing, ambiguity or ghost, making it difficult to distinguish the targets.

As shown in FIG. 2, in prior art work 2D radar imaging 210 is applied independently to data 201 received by each antenna array 200 to produce a corresponding low resolution 2D radar image 211. The 2D low resolution images aligned and summed 220 to produce 212 a 2D radar image 230 with artifacts, such as aliasing, ambiguity or ghosts.

The performance of the imaging system can be improved using distributed sensing and jointly processing all measurements using methods based on compressive sensing (CS). CS enables accurate reconstruction of signals using a significantly smaller sampling rate compared to the Nyquist rate. The reduction in the sampling rate is achieved by using randomized measurements, improved signal models, and non-linear reconstruction methods, see Candes et al., "Robust uncertainty principles: Exact signal reconstruction from highly incomplete frequency information," IEEE Transactions on Information Theory, vol. 52(2), February 2006. In radar applications, CS can achieve super-resolution images by assuming that the received signal can be modeled as a linear combination of waveforms corresponding to the targets and the underlying vector of target reflectivity is sparse, see Baraniuk et al., "Compressive radar imaging," IEEE Radar Conference, MA, April 2007, Herman et al., "High-resolution radar via compressed sensing," IEEE Trans. Signal Process., vol. 57, June 2009, and Potter et al., "Sparsity and compressed sensing in radar imaging," Proceeding of the IEEE, vol. 98, pp. 1006-1020, June 2010.

SUMMARY OF THE INVENTION

The embodiments of the invention provide a method and system for generating an radar image of an area of interest using a single static transmitter and multiple spatially distributed static linear antenna arrays, and compressive sensing (CS). The poses, e.g., locations and orientations, of the antenna arrays are known, and all measurements are synchronized. The method improves the image quality by imposing sparsity on complex coefficients of targets within the area of interest.

Specifically, the single transmitter emits radar pulses, and the multiple small aperture distributed arrays receive echoes reflected by the targets. The multiple arrays are uniform linear arrays randomly distributed with different locations and orientations at a same side of the area of interest. Although the image resolution of each array is low, due to the small aperture size, a high resolution is achieved by combining signals received by all distributed arrays using a sparsity-driven imaging method.

Compared to a conventional delay-and-sum imaging method, which typically exhibits annoying artifacts, such as aliasing, ambiguity or ghost, the distributed small-aperture arrays and the sparsity-driven methods increases the resolution of the images without artifacts.

DETAILED DESCRIPTION OF THE PREFERRED EMBODIMENTS

The embodiments of our invention provide a radar imaging method and system for generating a radar image of an area of interest using a single transmit antenna and multiple spatially distributed static linear antenna arrays, and compressive sensing (CS).

Distributed Sensing System

Figure 1:
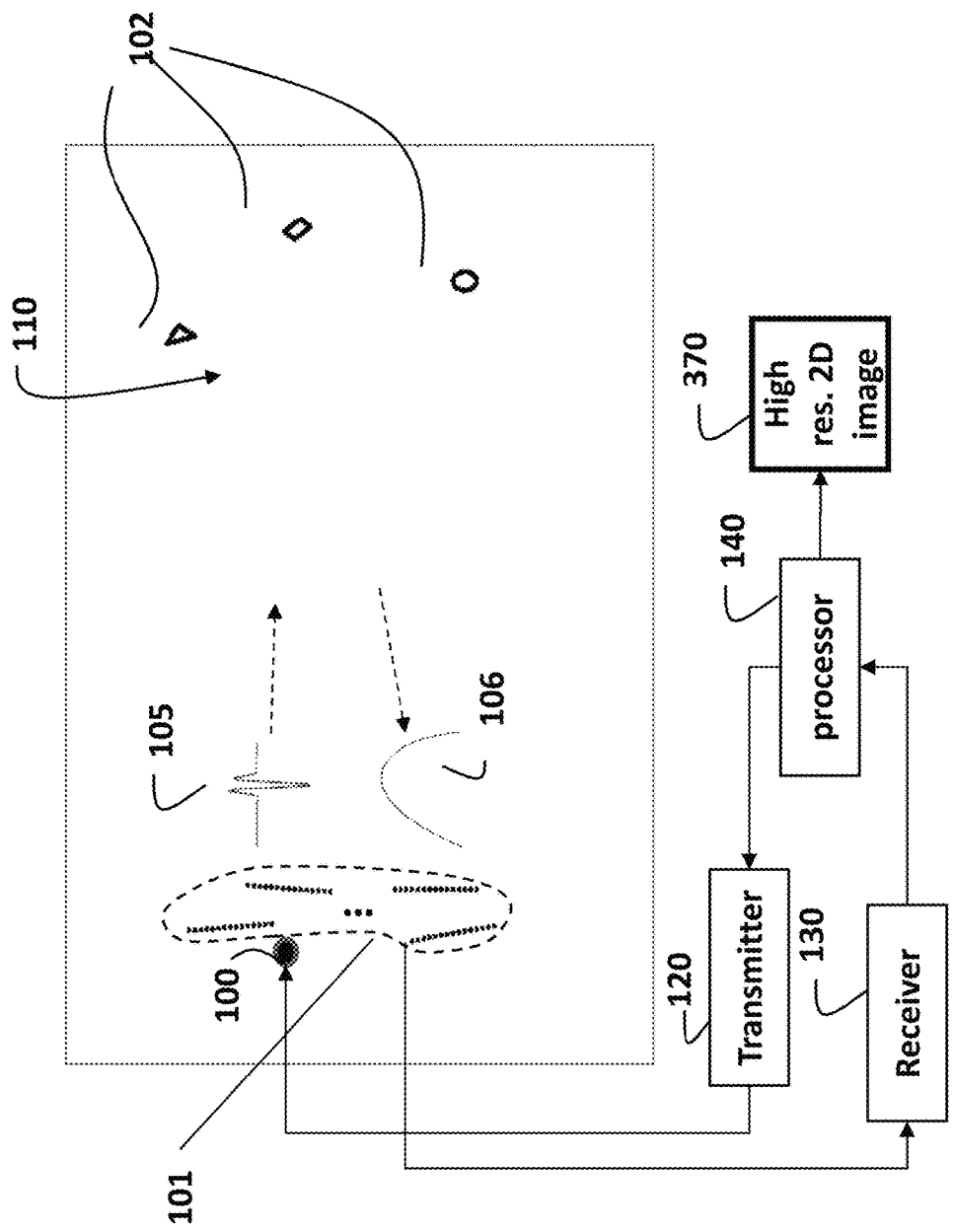
FIG. 1 is a schematic of a radar imaging system according to embodiments of the invention.
Figure 2:
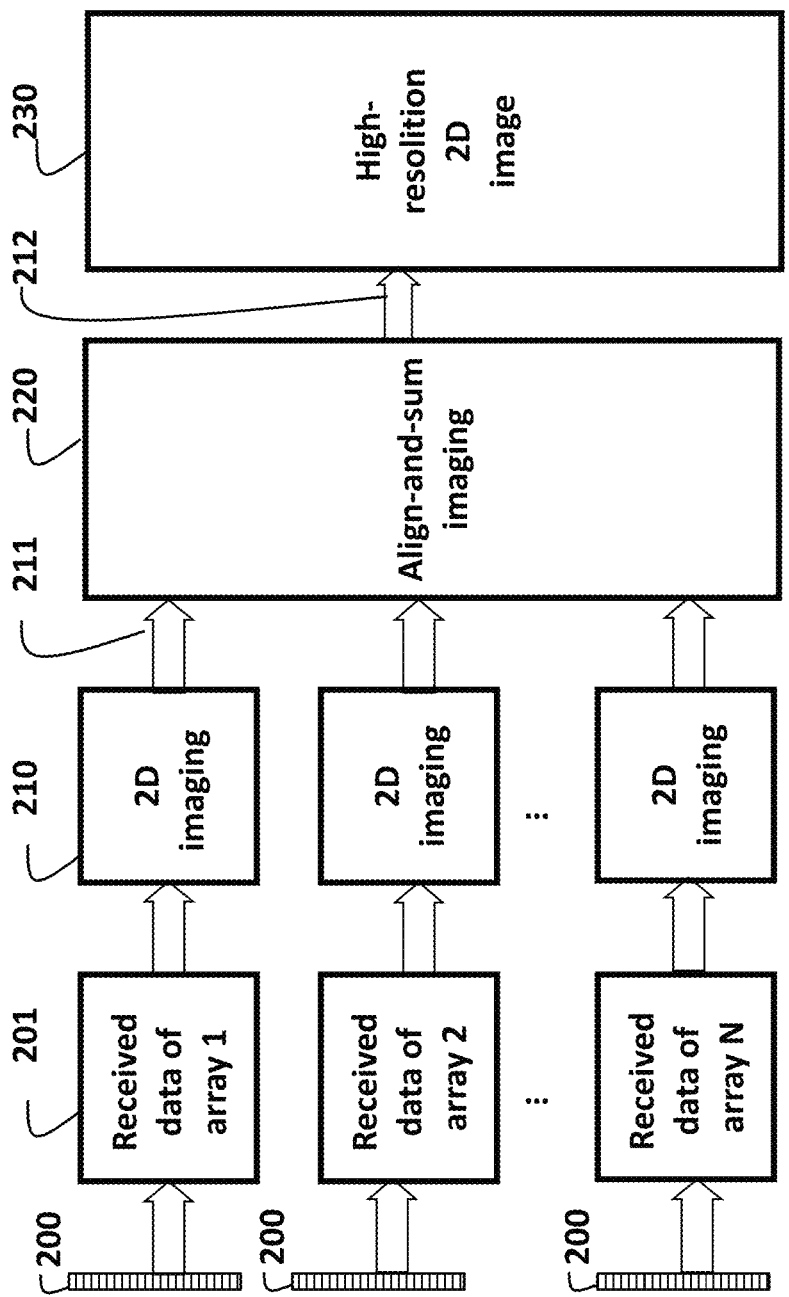
FIG. 2 is a flow diagram of a conventional radar imaging method according to embodiments of the invention.

As shown in FIG. 1, the radar imaging system includes one static transmit antenna 100, and a set of M distributed linear receive arrays 101. Each array has a set of $N_m$ (m=1, . . . , M) receive antennas. The antenna arrays are static and placed at the same side of the area of interest with random orientations, within a predetermined angular range.

The transmit antenna is connected to a radar transmitter 120 that generates the radar pulses. The received arrays are connected to a radar receiver 130 to acquire echoes of pulses reflected by targets in the area of interest. The transmitter and receiver are connected to a processor 140 that performs the radar imaging method to produce a high resolution two-dimensional (2D) radar image 370 as described in detail below. The processor can also determine delays between the transmitted pulse and the received echoes.

Compressive Sensing Based Distributed Array Imaging Method

Figure 3:
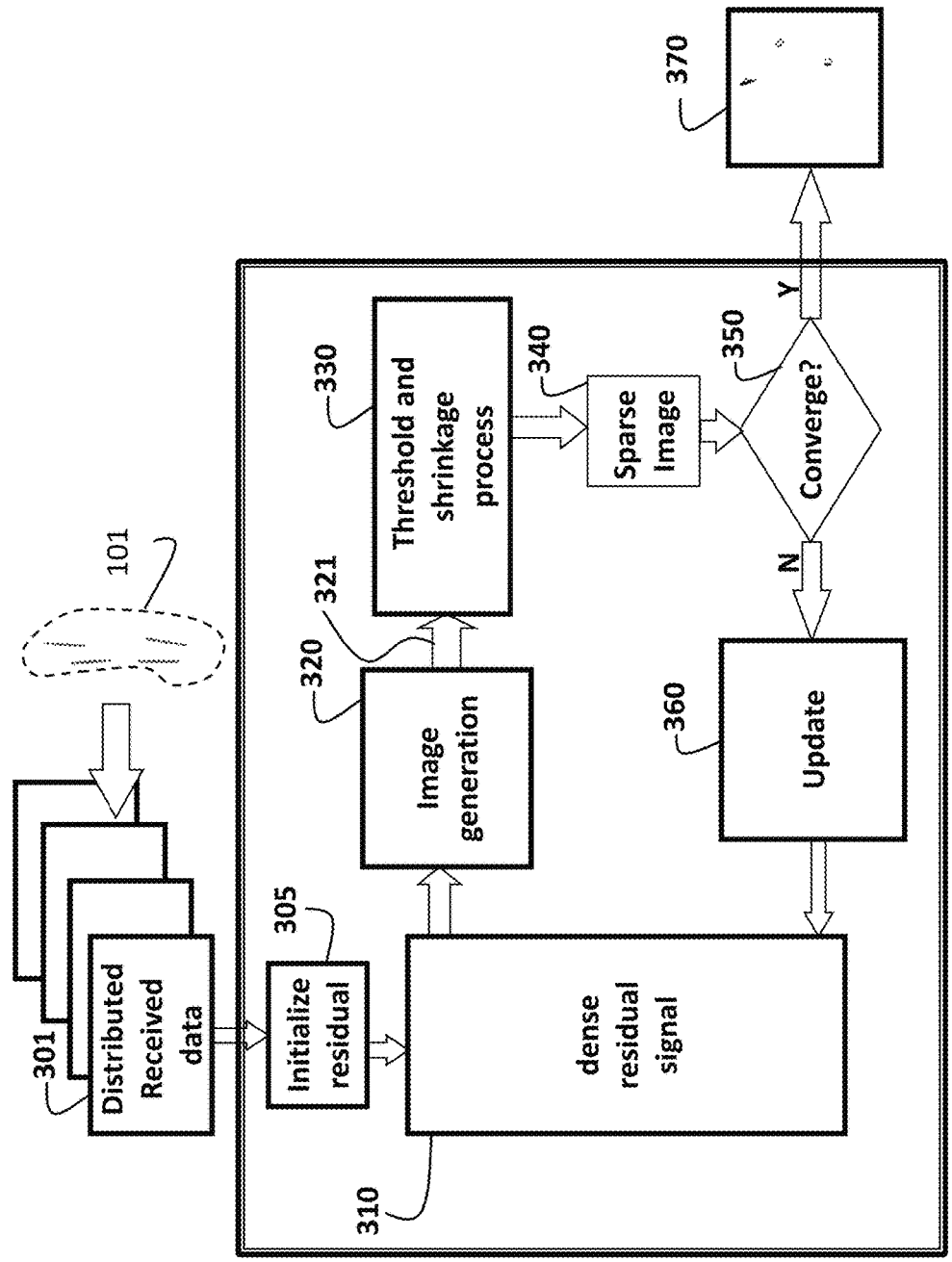
FIG. 3 is a flow diagram of a compressive sensing based distributed array imaging method according to embodiments of the invention.

As shown in FIG. 3, the distributed received data 301 are processed using iterative compressive sensing based procedures. Initialize residual 305 results in a dense residual signal 310 from distributed data 301 received as echoes from each distributed antenna array 101. Image generation 320 generates a 2D image 321 using the dense residual signal 310. Next, we apply a threshold and shrinkage process 330 to the 2D image 321, either in an image domain or image gradient domain, to generate a sparse image 340. The image is compared to the sparse image of a previous iteration to check for convergence 350 of the images, or not. If a relative error between the two images is smaller than a predetermined threshold, then we have converged to a high resolution 2D image 370. Otherwise, the residual signal 310 updates 360 by subtracting a signal corresponding to the current sparse image until convergence.

Details of the method are described below.

As shown in FIG. 1, a time-domain radar pulse p(t) 105 is transmitted by the transmit antenna 100 located at $I_S$. For a single point target 102 located at $I_T$, a radar echo 106 received by the $n^{th}$ element 101 at location $I_{m,n}$ of the $m^{th}$ array can be expressed in the frequency domain as $$Y(\omega, I_S, I_{m,n}) = P(\omega)X(I_T)e^{-j\omega\frac{\|I_S - I_T\| + \|I_{m,n} - I_T\|}{c}}, \quad (1)$$

where $P(\omega)$ is the frequency spectrum of the emitted pulse, which can be represented as $$P(\omega) = \int \mathbb{R}\, p(t)e^{-j\omega t}dt, \text{ where} \quad (2)$$

$X(I_T)$ is the reflectivity of the point target at the location $I_T$, where the exponential term is Green's function from the location at $I_S$ to the receive antenna at $I_{m,n}$ via the location $I_T$.

Without loss of generality, there are K targets 102 in the area of interest 110, where each target is composed of multiple stationary scattering centers. The size of the array aperture is relatively small, such that the same scattering centers are observed at all elements of the array.

We also discretize the area of interest, using a two-dimensional grid, where index i denotes each gridpoint, with corresponding location $I_i$. Consequently, the received signal can be modeled as the superposition of radar echoes of all K objects in the area of interest as follows $$Y(\omega, I_S, I_{m,n}) = \sum_i P(\omega)X(I_i)e^{-j\omega\frac{\|I_S - I_i\| + \|I_{m,n} - I_i\|}{c}}. \quad (3)$$

The relationship (3) can be compactly denoted in a matrix-vector form $$y_m = \Phi_m x_m + e_m, \quad (4)$$

where $y_m$, $\Phi_m$, and $x_m$ represent the samples of the received signals, the forward acquisition process, and the reflectivity corresponding to the $m^{th}$ array, respectively. Note that the vector $e_m$ in the discretized model in Eq. (4) represents the noise.

Assuming that the targets' complex coefficients are identical as observed by all the receivers, we can coherently combine all of the received data as $$y = \Phi x + e, \quad (5)$$

where
$y = [y_1, \ldots, y_M]^T$, $\Phi = [\Phi_1, \ldots, \Phi_M]^T$, and $x = x_1 = x_2 = \ldots = x_M$.

Again, the vector e in Eq. (5) represents the measurement noise.

The goal of the image formation process is to determine the signal of interest x from the array echoes y given the acquisition matrix $\Phi$. In other words, the objective is to solve a linear inverse problem. If the acquisition matrix $\Phi$ is invertible, then a straightforward choice is to use the inverse or the pseudoinverse of $\Phi$ to determine x, i.e., $$\hat{x} = \Phi^\dagger y. \quad (6)$$

However, due to the size of the acquisition matrix $\Phi$, the pseudo-inverse $\Phi^\dagger$ is impossible to compute directly. The conventional delay-and-sum imaging method uses the adjoint to estimate x $$\hat{x} = \Phi^H y. \quad (7)$$

In distributed sensing, the antenna arrays are generally non-uniformly distributed in the spatial domain. Therefore, the sidelobes of the beamforming imaging results are generally large, making it difficult to discriminate targets.

Compressive Sensing Imaging

In order to improve the imaging resolution of distributed sensing, we describe two CS-based imaging methods. Our first method is based on enforcing image sparsity directly in the spatial domain. However, since spatial-domain sparsity is not strictly true for radar images, we also describe a post-processing step to further boost the performance of conventional CS-based radar imaging in the presence of noise. The second method circumvents the post-processing by imposing sparsity in the gradient domain, which is a more realistic assumption for the radar imaging, where images are often piecewise smooth.

Image-Domain Sparsity

A non-uniform array generally generates larger sidelobes than a uniform array of the same size. Accordingly, in the first approach, we interpret the distributed measurements as the downsampled versions of the data from larger distributed uniform arrays, where each large array has about the same aperture size (see yellow dotted lines in FIG. 1). Using noiseless version of equation (5), we represent the full data on the larger uniform arrays as $y_{full}$. The vector $y_{full}$ includes the measured data y and unmeasured data $\bar{y}$ as follows $$y_{full} = \begin{bmatrix} y \\ \bar{y} \end{bmatrix} = \begin{bmatrix} E \\ \bar{E} \end{bmatrix} \Psi x. \quad (8)$$

Here, E and $\bar{E}$ represent complementary down-sampling operators, respectively, and $\Psi$ denotes the measurement matrix for large uniform aperture arrays.

In conventional CS, the vector x is modeled as a sparse signal, which is generally not true in radar imaging. Instead of simply treating x as a sparse signal, we decompose x into sparse part $x_s$ and dense residual $x_r$ as $$x = x_s + x_r. \quad (9)$$

Substituting this expression into Eq. (8), noisy measured data can be expressed as $$y = E\Psi x_s + E\Psi x_r + e. \quad (10)$$

Treating $E\Psi x_r$ as an additional noise component, the estimate of the sparse component $x_s$ is given by $$\hat{x}_s = \arg\min_x \|y - E\Psi x\|_{l_2}^2 \text{ s.t. } \|x\|_{l_0} < N. \quad (11)$$

The above problem can be solved by various compressive sensing solvers. We rely on an iterative method based on Stagewide Orthogonal Matching Pursuit (STOMP), see Donoho et al., "Sparse solution of underdetermined systems of linear equations by stagewise orthogonal matching pursuit," IEEE Trans. Information Theory, February 2012, and Liu et al., "Random steerable arrays for synthetic aperture imaging," in IEEE International conference on Acoustics Speech and Signal Processing (ICASSP), 2013.

Given the estimate $\hat{x}_s$, we can estimate its contribution to the measured data as $E\Psi\hat{x}_s$. Assuming the residual data $y_r = y - E\Psi\hat{x}_s$ is due to the dense part $x_r$, we use the adjoint process with line search to estimate it as follows $$\hat{x}_r = \frac{y_r^H y_r}{y_r^H \Psi \Psi^H y_r} \Psi^H y_r. \tag{12}$$

We obtain the high resolution image by combining Eqs. (11) and (12) as follows $$\hat{x} = \hat{x}_s + \hat{x}_r. \tag{13}$$

Alternatively, we can estimate the missing data on the large uniform arrays using the sparse estimate $\hat{x}_s$ as $$\bar{y} = E\Psi\hat{x}_s. \tag{14}$$

Combining Eqn. (14) with the measured data, we obtain an estimate of a full data set for the large aperture arrays as $$\hat{y}_{full} = E^\dagger y + \overline{E}^\dagger \overline{E}\Psi\hat{x}_s. \tag{15}$$

Note that E is a selection operator, and its pseudoinverse $E^\dagger$ fills missing data with zeros.

Based on the estimated data, we can perform the imaging using a conventional align-and-sum imaging method $$\hat{x} = \Psi^H \hat{y}_{full} = \Psi^H \left( E^\dagger y + \overline{E}^\dagger \overline{E}\Psi\hat{x}_s \right) \tag{16}$$
$$= \Psi^H \Psi \hat{x}_s + \Psi^H E^\dagger E\Psi\hat{x}_r.$$

The final images in Eq. (13) and (16) are not strictly sparse. The result in Eq. (13) is generally sharper than that in (16), because the term $\Psi^H\Psi$ works as a low pass filter, with filtering characteristics related to the large aperture measurement matrix $\Psi$. In practice, because radar echoes are noisy, the final imaging result is visually better when using Eq. (16).

Image Gradient-Domain Sparsity

We formulate the gradient-domain method as a minimization problem $$\hat{x}_{TV} = \operatorname*{argmin}_{x} \left\{ \frac{1}{2} \|y - \Phi x\|_{l_2}^2 + \lambda TV(x) \right\}, \tag{17}$$

where TV denotes an isotropic total variation regularizer $$TV(x) \triangleq \sum_i \|[Dx]_i\|_{l_2} \tag{18}$$
$$= \sum_i \sqrt{|[D_x x]_i|^2 + |[D_y x]_i|^2}. \tag{19}$$

Here, $\lambda > 0$ is the regularization parameter and $[Dx]_i = ([D_x x]_i, [D_y x]_i)$ denotes the $i^{th}$ component of the image gradient. Because the TV-term in Eq. (17) is non-differentiable, we formulate the problem as the following equivalent constrained optimization problem $$(\hat{x}, \hat{d}) = \operatorname*{argmin}_{x,d} \left\{ \frac{1}{2} \|y - \Phi x\|_{l_2}^2 + \lambda \sum_i \|[d]_i\|_{l_2} : d = Dx \right\}.$$

We solve the constrained optimization problem by designing an augmented Lagrangian (AL) scheme, see Tao and J. Yang, "Alternating direction algorithms for total variation deconvolution in image reconstruction," TR 0918, Department of Mathematics, Nanjing University, 2009. Specifically, by seeking the critical points of the following cost $$\mathcal{L}(x, d, s) \triangleq \tag{20}$$
$$\frac{1}{2}\|y - \Phi x\|_{l_2}^2 + \lambda \sum_i \|[d]_i\|_{l_2} + \operatorname{Re}\{s^H(d - Dx)\} + \frac{\rho}{2}\|d - Dx\|_{l_2}^2,$$

where s is the dual variable that imposes the constraint $d = Dx$, and $\rho > 0$ is the quadratic penalty parameter. Conventionally, an AL scheme solves the Eq. (20) by alternating between a joint minimization step and a Lagrangian update step as $$(x^{k+1}, d^{k+1}) \leftarrow \operatorname*{argmin}_{x,d} \{\mathcal{L}(x, d, s^k)\}, \text{ and} \tag{21}$$

$$s^{k+1} \leftarrow s^k + \rho(d^{k+1} - Dx^{k+1}). \tag{22}$$

However, the joint minimization step (21) can be computationally intensive. To circumvent this problem, we separate (21) into a succession of simpler steps. This form of separation is commonly known as the alternating direction method of multipliers (ADMM), see Boyd et al, "Distributed optimization and statistical learning via the alternating direction method of multipliers," Foundations and Trends in Machine Learning, vol. 3, no. 1, pp. 1-22, 2011.

ADMM and can be described as follows $$d^{k+1} \leftarrow \operatorname*{argmin}_{d} \{\mathcal{L}(x^k, d, s^k)\} \tag{23}$$

$$x^{k+1} \leftarrow \operatorname*{argmin}_{x} \{\mathcal{L}(x, d^{k+1}, s^k)\} \tag{24}$$

$$s^{k+1} \leftarrow s^k + \rho(d^{k+1} - Dx^{k+1}). \tag{25}$$

The step in Eq. 23 admits a closed-form solution $$[d^{k+1}]_i \leftarrow \mathcal{T}([Dx^k - s^k/\rho]_i; \lambda/\rho),$$

where i is the pixel number and $\mathcal{T}$ is the component-wise shrinkage function $$\mathcal{T}(y, \tau) \triangleq \operatorname*{argmin}_{x \in \mathbb{C}^2} \left\{ \frac{1}{2}\|x - y\|_{l_2}^2 + \tau\|x\|_{l_2} \right\} \tag{26}$$
$$= \max(\|y\|_{l_2} - \tau, 0) \frac{y}{\|y\|_{l_2}}. \tag{27}$$

The step in Eq. (23) reduces to a linear solution $$x^{k+1} = (\Phi^H\Phi + \rho D^H D)^{-1}(\Phi^H y + \rho D^H(d^{k+1} + s^k/\rho)).$$

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating a high resolution two-dimensional (2D) radar image using a processor, comprising steps:
   transmitting a radar pulse by a transmit antenna at an area of interest;
   receiving echoes, corresponding to a reflection of the radar pulse in the area of interest, at a set of receive arrays, wherein each array includes a set of receive antennas that are static and distributed at different locations at a same side of the area of interest with an orientation within a predetermined angular range;
   sampling the echoes for each receive array to produce distributed data for each array;
   applying a compressive sensing (CS) procedure to the distributed data to generate the high resolution 2D radar image;
   initializing a residual signal using the received echoes, and wherein the CS procedure includes iterative steps;
   generating a two-dimensional (2D) radar image from the distributed residual signal;
   applying a threshold and shrink process to the 2D radar image to produce a sparse image for a current iteration;
   comparing the sparse image of the current iteration to a sparse image of a previous iteration, and if a relative error between the sparse image of the current iteration and the sparse image of the previous iteration is smaller than a predetermined threshold then the sparse image of the current iteration is the high resolution 2D radar image, and otherwise:
   subtracting the signal of the current sparse image from the dense residual signal and iterating the generating, applying and comparing steps.

2. The method of claim 1, wherein the sampling is uniform.

3. The method of claim 1, the CS procedure reduces artifacts in the 2D radar image.

4. The method of claim 1, wherein the CS procedure uses image domain sparsity in an iterative reconstruction method.

5. The method of claim 1, wherein the CS uses image gradient domain sparsity is an iterative reconstruction method.

6. A system for generating a high resolution two-dimensional (2D) radar image, comprising:
   a transmit antenna configured to transmit a radar pulse at an area of interest;
   a set of receive arrays configured to receive echoes corresponding to a reflection of the radar pulse in the area of interest, wherein each array includes a set of receive antennas that are static and distributed at different locations at a same side of the area of interest with an orientation within a predetermined angular range; and
   a processor configured to sample the echoes for each receive array to produce distributed data for each array and then applying a compressive sensing (CS) procedure to the distributed data to generate the high resolution 2D radar image, wherein the steps further comprises:
   initializing a residual signal using the received echoes, and wherein the CS procedure includes iterative steps;
   generating a two-dimensional (2D) radar image from the distributed residual signal;
   applying a threshold and shrink process to the 2D radar image to produce a sparse image for a current iteration; and
   comparing the sparse image of the current iteration to a sparse image of a previous iteration, and if a relative error between the sparse image of the current iteration and the sparse image of the previous iteration is smaller than a predetermined threshold then the sparse image of the current iteration is the high resolution 2D radar image, and otherwise:
   subtracting the signal of the current sparse image from the dense residual signal and iterating the generating, applying and comparing steps.

7. The method of claim 6, the CS procedure reduces artifacts in the 2D radar image.

8. The method of claim 6, wherein the CS procedure uses image domain sparsity in an iterative reconstruction method.

9. The method of claim 6, wherein the CS uses image gradient domain sparsity is an iterative reconstruction method.

* * * * *